United States Patent
Vroom et al.

(10) Patent No.: US 10,452,849 B2
(45) Date of Patent: Oct. 22, 2019

(54) METHOD AND APPARATUS FOR ISOLATING AN ELECTRONIC DEVICE FROM EXTERNAL DATA SIGNALS

(71) Applicant: Henge Docks LLC, Arlington, VA (US)

(72) Inventors: Matthew Leigh Vroom, San Francisco, CA (US); Brandon Parod, Alameda, CA (US)

(73) Assignee: Brydge Technologies LLC, Park City, UT (US)

(*) Notice: Subject to any disclaimer, the term of this patent is extended or adjusted under 35 U.S.C. 154(b) by 420 days.

(21) Appl. No.: 15/082,771

(22) Filed: Mar. 28, 2016

(65) Prior Publication Data

US 2017/0277894 A1    Sep. 28, 2017

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/57 | (2013.01) |

(52) U.S. Cl.
CPC ........ *G06F 21/57* (2013.01); *G06F 2221/034* (2013.01)

(58) Field of Classification Search
CPC .............. G06F 21/57; G06F 2221/03; G06F 2221/034; G06F 21/60
See application file for complete search history.

(56) References Cited

U.S. PATENT DOCUMENTS

| | | | | |
|---|---|---|---|---|
| 4,779,224 A | * | 10/1988 | Moseley | G06F 21/31 380/28 |
| 2015/0380924 A1 | * | 12/2015 | Ohwaki | H02H 3/0935 361/93.7 |
| 2016/0373408 A1 | * | 12/2016 | Wentworth | H04L 63/0227 |
| 2017/0038810 A1 | * | 2/2017 | Ueki | G06F 21/44 |
| 2017/0117719 A1 | * | 4/2017 | Su | G06F 1/00 |
| 2017/0325320 A1 | * | 11/2017 | Wendt | H05B 37/0263 |

* cited by examiner

*Primary Examiner* — Trong H Nguyen
*Assistant Examiner* — Amie C. Lin
(74) *Attorney, Agent, or Firm* — Maskell Law PLLC; Benjamin E. Maskell

(57) ABSTRACT

Disclosed is a security device for selectively isolating an electronic device from external data signals, including an input for receiving an external cable, an output for connecting to the electronic device, a configuration line coupled from the input to the output, a power line coupled from the input to the output, a ground line coupled from the input to the output, a plurality of data lines, and a first switch selectively coupling the data lines from the input to the output. The security device can further include a filter in the configuration line where the filter configured to receive an encoded message, compare the encoded message against a messaging specification, and selectively transmit the encoded message when the encoded message complies with the specification.

6 Claims, 4 Drawing Sheets

METHOD AND APPARATUS FOR ISOLATING AN ELECTRONIC DEVICE FROM EXTERNAL DATA SIGNALS

BACKGROUND OF THE INVENTION

Field of the Invention

The embodiments of the invention relate to electronic security devices, and more particularly, to a switch and filter for isolating an electronic device from external signals. Although embodiments of the invention are suitable for a wide scope of applications, it is particularly suitable for protecting an electronic device from nefarious data snooping when using third-party chargers.

Discussion of the Related Art

Portable electronic devices such as laptops and cell phones are ubiquitous in modern life. These devices commonly include a general purpose processor, memory, and rechargeable batteries for powering the device. The devices include a variety of physical connectivity options, generally including ports and plugs for connecting external devices such as peripherals and power supplies.

As electronic device become ever smaller, the manufacturers seek to minimize physical connectivity options to save space. In a recent development, a new connectivity option the USB Type-C connector (USB-C) combines traditional USB 2.0, USB 3.0, and power delivery. A complete discussion of the USB protocols, connectors, and specifications is available from the USB Implementers Forum, Inc. and available at www.USB.org/developer/docs the entirety of which is hereby incorporated by reference. The USB-C connector has been embraced by some laptop manufacturers such as Apple to provide a single connectivity option both charging and connecting data peripherals. In some computer models, Apple includes just a single port that is used for both charging the device and connecting external peripherals.

Users of portable electronic devices are prone to forget the charging cables for their devices or unexpectedly find themselves with a low battery and need to borrow a charger from another person. As the USB-C connector becomes more popular and is implemented on more devices, it is possible that the USB-C connector will become a de facto standard. In such cases it may be unlikely that a user would bring their personal charger when traveling and instead opt to use a charger provided by another such as their workplace, a conference room, a hotel room, etc.

However, because both power and data are transmitted over the same cable, potential security problems can arise when using a charger provided by another. For example, because data and power are transmitted over a single connector, a nefarious entity may provide free device charging, such as in an airport or hotel, and simultaneously use the data connection to compromise the data stored on the electronic device.

Traditionally, a user could protect their device from such an intrusion by refraining from connecting external peripherals from untrusted third parties. However, when power and data are transmitted over same connector it is impossible to selectively refrain from connecting external data sources when charging an electronic device. A potential solution could be to simply provide a cable or connector that lacks data connections and provides only power connections. Such a solution is unworkable, however, because the power supply and the electronic device often need to exchange certain messages over a data connection to initiate charging, specify the power parameters such as voltage and available current, and provide notification of when charging is complete. Thus, there is a need to provide protection from untrusted, third-party device chargers when using connectors that provide both power and data connectivity.

SUMMARY OF THE INVENTION

Accordingly, embodiments of the invention are directed to a method and apparatus for isolating an electronic device from external data signals that substantially obviates one or more of the problems due to limitations and disadvantages of the related art.

An object of embodiments of the invention is to provide a security device to isolate an electronic device from external data signals.

Another object of embodiments of the invention is to provide user-selectable isolation from external data signals.

Yet another object of embodiments of the invention is to provide secure setup of device charging through existing messaging protocols.

Still another object of embodiments of the invention is to provide a security device that can identify trusted data communications and reject untrusted data communications.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a method and apparatus for isolating an electronic device from external data signals includes an input for receiving an external cable, an output for connecting to the electronic device, a configuration line coupled from the input to the output, a power line coupled from the input to the output, a ground line coupled from the input to the output, a plurality of data lines, and a first switch selectively coupling the data lines from the input to the output. The security device can further include a filter in the configuration line where the filter configured to receive an encoded message, compare the encoded message against a messaging specification, and selectively transmit the encoded message when the encoded message complies with the specification.

In another aspect, a method and apparatus for isolating an electronic device from external data signals includes a method for operating a filter to isolate an electronic device from potentially nefarious data signals, including setting the filter to a learning mode, receiving a trusted encoded message on a configuration line, storing the trusted encoded message in a message memory to create a stored trusted message, transmitting the trusted encoded message on the configuration line, setting the filter to a secure mode, receiving a second encoded message on the configuration line, comparing the second encoded message to the stored trusted message, and transmitting the second encoded message on the configuration line when the second encoded message matches the stored trusted message.

In yet another aspect, a method and apparatus for isolating an electronic device from external data signals includes a method for operating a filter to isolate an electronic device from potentially nefarious data signals including receiving an encoded message on a configuration line, comparing the encoded message against a stored messaging specification, and transmitting the encoded message when the encoded message complies with the specification.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Figure 1:
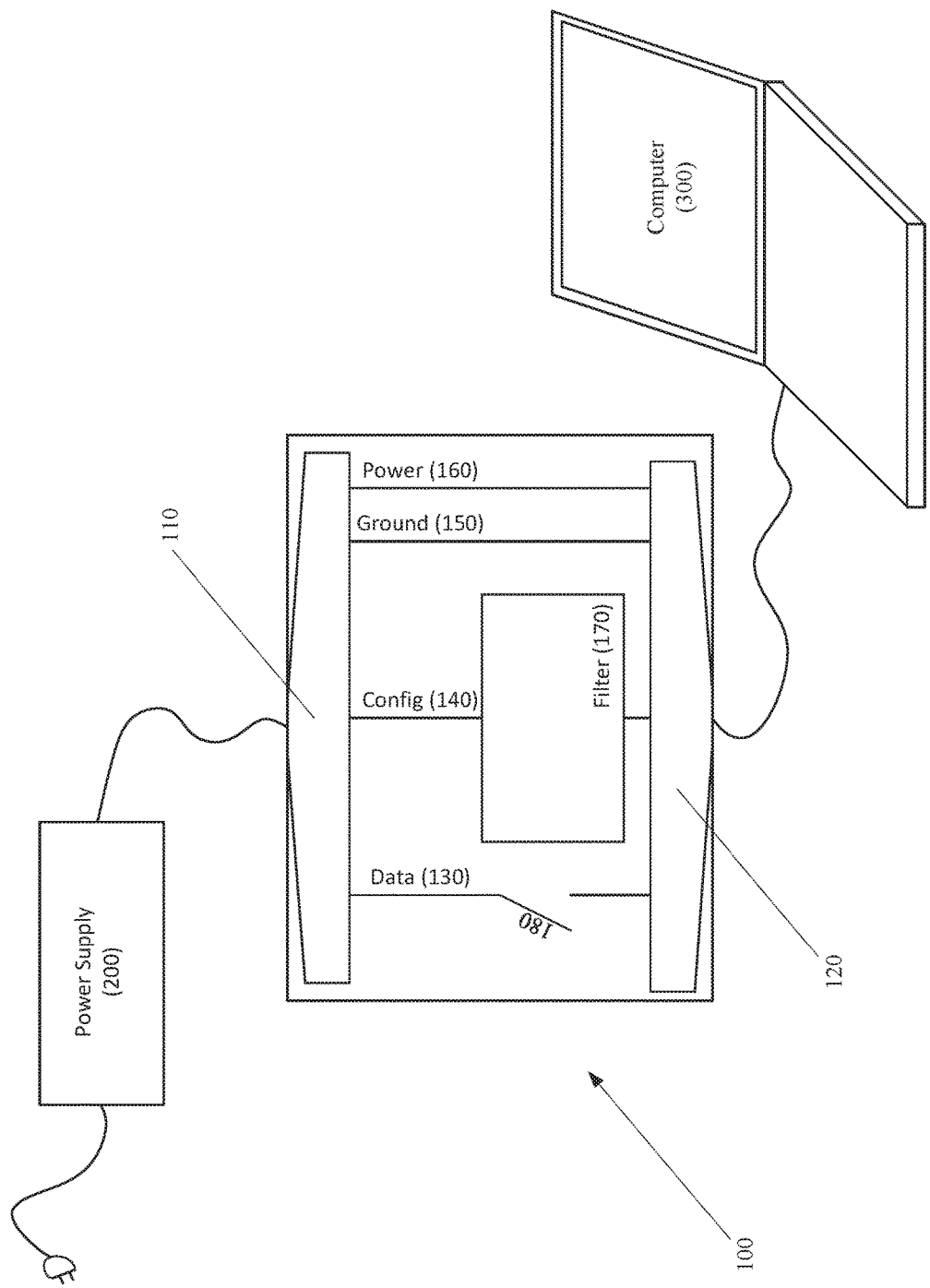
FIG. 1 is schematic of system including a security device according to an embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 is schematic of system including a security device according to an embodiment of the invention. As shown in FIG. 1, the system includes a security device 100, a power supply 200, and a computer 300. It is contemplated that the power supply 200 may be untrusted and attempt to utilize a combined data and power line to access data stored on the computer 300. The security device 100 includes an input 110, an output 120, a plurality of signal lines 130, 140, 150, 160, a filter 170, and a switch 180.

The input 110 refers generally to the set of physical inputs received by the security device 100. Similarly, the output 120 refers generally to the set of physical outputs sent by the security device 100. The input 110 and the output 120 can each (respectively) be a single connector, such as a USB-C connector. Although the connections have been described as "input" and "output" it should be appreciated that communications are typically bi-directional and that the output 120 may receive messages from the computer 300 and transmit the messages through the input 110 to the power supply 120.

A ground line 150 for power delivery can connect a ground on the input 110 to a ground on output 120. A power line 160 can connect a power source on the input 110 to a power source on the output 120.

Signal line 130 can be a data signal line. Although the signal line 130 is referred to in the singular, it should be appreciated that the signal line 130 can represent multiple signal lines. For example, with a USB-C connection, there are multiple data lines for USB 3.0 communications and USB 2.0 communications. A switch 180 is provided in the data signal line 130. The switch 180 can be a physical hardware switch accessible to a user on the exterior of the security device 100. The switch 180 can be "on" or "off" In the "on" position the switch 180 can provide a continuous connection on the data line 130 between the input 110 and the output 120. This is potentially unsecured as the power supply 200 would have direct data communication over data line 130 with the computer 300. Such a configuration could be used with a known trusted power supply such as a power supply provided by the original equipment manufacture of the computer 300. In the "off" position, the switch 180 can break the connection of the data line 130 between the input 110 and the output 120. This can effectively isolate the computer 300 from the power supply 200.

However, as will be known to those of skill in the art, some data communication between the computer 300 and the power supply 200 can be needed to initiate and maintain power transfer between the power supply 200 and the computer 300. Some communications protocols, such as the communication protocol for USB-C power delivery, provide a dedicated data line for communicating power delivery messages. The config line 140 can correspond to a dedicated configuration line for power delivery messages such as USB power delivery messages.

In embodiments of the invention, the config line 140 can pass through a filter 170. In other embodiments of the invention, the filter 170 can be omitted or bypassed according to user preference. A switch (not shown) can be provided to bypass the filter 170. The filter 170 can ensure that messages transmitted between the input 110 and the output 120 on the config line 130 are safe. Embodiments of the filter 170 are discussed in conjunction with FIGS. 2-4.

Embodiments of the invention have been described as applicable to USB-C connections. The invention, however, is directed to all types of connections that provide both data and power. For example, a cell phone such as an iPhone can be connected to a computer via a cable having a standard USB to lightning-style connector. In such a connection the computer would provide power and a data connection to the cell phone. It may be desirable in certain instances for the owner of the cellphone, however, to isolate the cell phone from the computer to prevent an unauthorized transfer of data from the cell phone to the computer. Similarly, a computer is typically configured to launch certain applications when a particularly peripheral, such as a cell phone, is connected to the computer. More specifically, computers having the software application iTunes are typically configured to automatically launch the iTunes application when an iPhone is connected. However the user connected the iPhone or the user of the computer may not desire to launch iTunes because doing so may be distracting to the work flow or cause unnecessary dedication of computing resources to iTunes application. In such an instance, the invention can be applied to isolate the computer from the iPhone (and vice versa) to protect against an unauthorized data transfer between the two devices and to prevent the undesired automatic execution of applications on the computer or iPhone when one is connected to the other.

Figure 2:
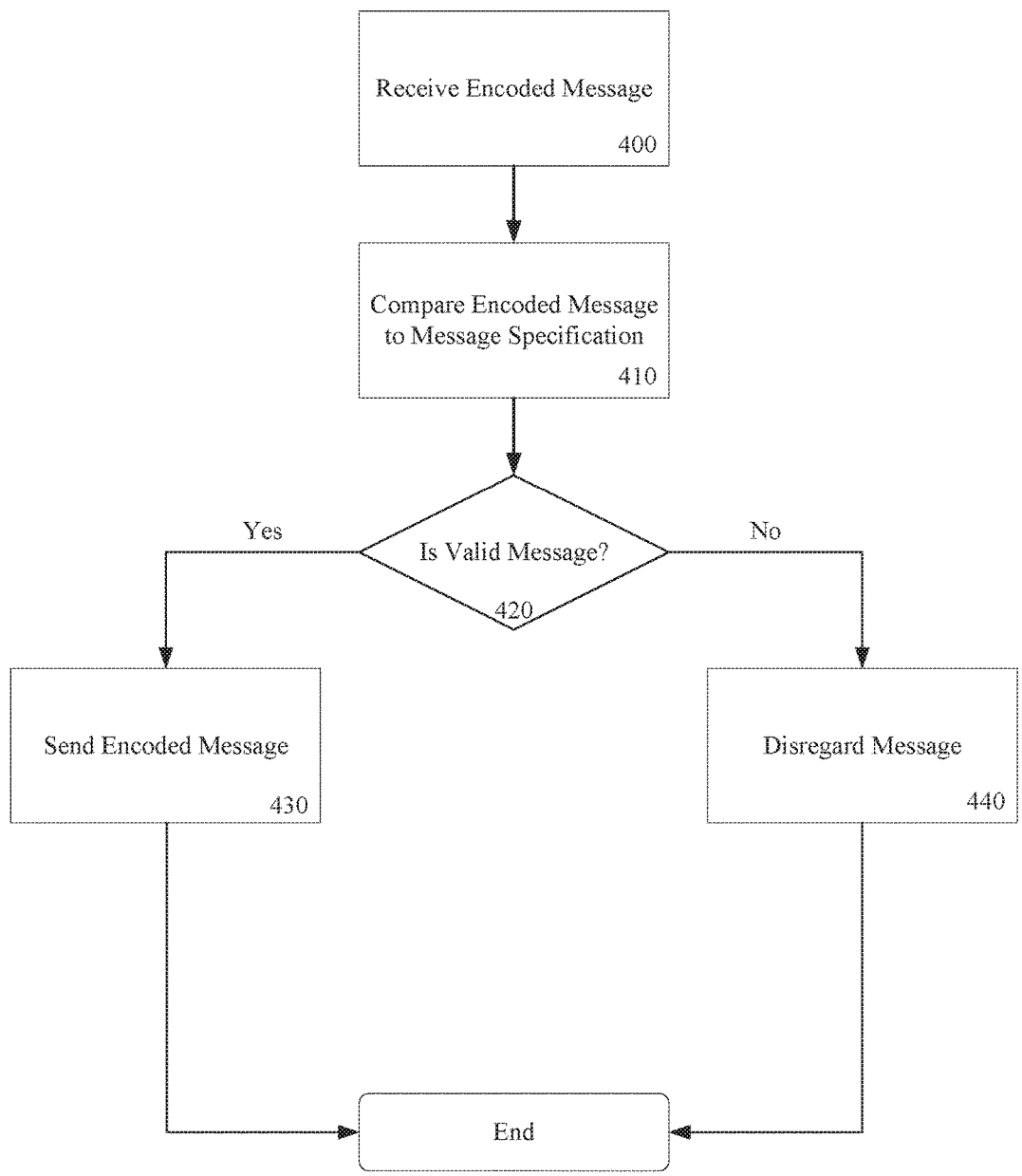
FIG. 2 is a process flow chart for a filter according to an embodiment of the invention.

FIG. 2 is a process flow chart for a filter according to an embodiment of the invention. As shown in FIG. 2, a filter can receive a message at step 400, compare the message to a specification at step 410, determine if the message is valid 420, and selectively send 430 or discard 440 the message.

In step 400 a message can be received at a filter. The filter can be the filter 170 of FIG. 1. The message can be received by the filter from either the input 110 or the output 120 of FIG. 1. The message can be a power delivery message such as the power delivery messages specified in the USB power delivery protocol. In step 410 the received messages can be compared to the protocol. The protocol can be any protocol although embodiments of the invention specifically contemplate the USB power delivery protocol. Comparing the received messages to the protocol can include validating message contents and parameters. For example, if a message specifies a parameter or value, the comparing step 410 can ensure that the parameter or value is within reasonable bounds or is within the bounds or limits provided in the protocol. In a more specific example, in the USB power delivery protocol a device can specify a voltage to the power supply and the power supply can, in turn, configure the power lines to deliver the specified voltage. Similarly, the power supply can communicate the maximum current it is capable of supplying to the electronic device. Each of these parameters have reasonable bounds. For example, neither the current nor the voltage should be zero or negative. Similarly, it is unlikely that the voltage will exceed 24 v or a current will exceed 5 amps. Additionally, the protocol can specify limits for parameters such as 5 v-20 v for a voltage or 500 ma to 5000 ma for a current. Thus the comparing the message to the message specification step 410 can compare the message parameters to limits and bounds specified in the messaging specification and compare the messaging parameters to "reasonability" thresholds based on the specific implementation of the filter.

The step 410 is important in ensuring the data security of the electronic device because, unlike the data line (130 of FIG. 1) the config line (140 of FIG. 1) cannot be completely disconnected because it is commonly used to transmit messages relating to power deliver and power configuration. It is contemplated that a nefarious power supply could use the configuration line and malformed power delivery messages to transmit and receive unauthorized data messages between the power supply and the computer. The compare step 410 can verify that the messages sent on the configuration line comply with the messaging protocol and are within reasonable bounds. Although this compare step 410 is described as the conjunction of comparing the message to the protocol and comparing the message to reasonable bounds, either or both of these comparisons can be evaluated in the compare step 410. Additionally, reasonable bounds should be apparent to those of skill in the art who can chose reasonable bounds according to the specific application. For example, it is unlikely that a cell phone would need more than 4 amps or less than 500 ma. Thus those numbers could represent reasonability thresholds for a cell phone. Different thresholds could apply for charging a laptop computer or tablet device.

In step 420, the process determines whether the result of the compare step was favorable. If the message complied with the messaging protocol and was within reasonable limits, the message can be allowed to "pass" through the filter to step 430 where the message is transmitted on through the filter in step 430. In the alternative, if the message did not comply with the messaging protocol or was not within reasonable limits, the message can be discarded by the filter in step 440. The process described in conjunction with FIG. 2 can be applied to every message that passes through the filter.

Figure 3:
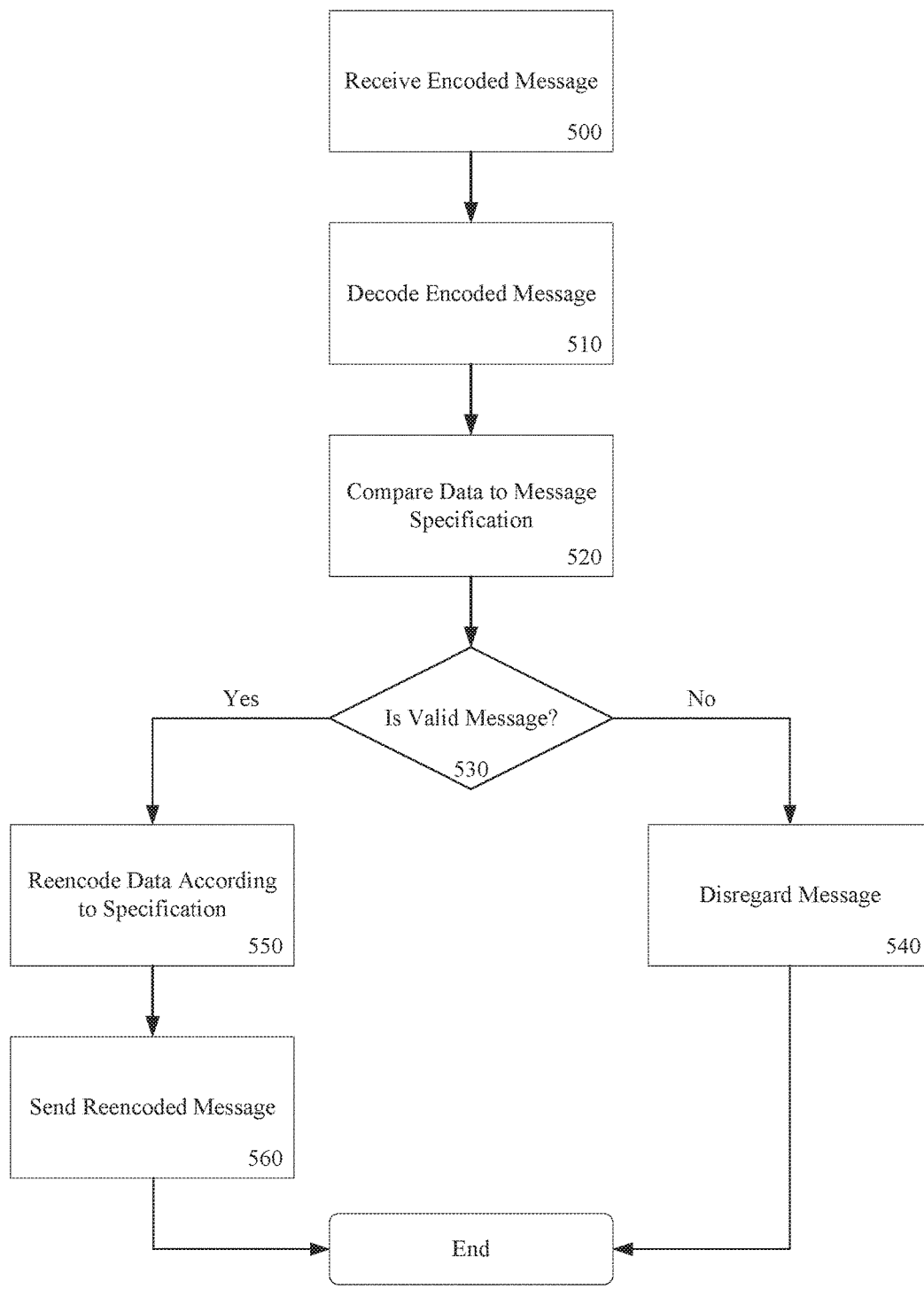
FIG. 3 is a process flow chart for a filter according to an embodiment of the invention.

FIG. 3 is a process flow chart for a filter according to an embodiment of the invention. As shown in FIG. 3, a filter can receive a message at step 500, decode the message at step 510, compare the decoded message to a specification at step 520, and determine if the message is valid at step 530. If the message is not valid, the message can be discarded at step 540. If the message is valid, the data can be reencoded according to the messaging specification at step 550 and passed through the filter in transmit step 560.

In step 500 an encoded message is received at the filter. The message can be encoded according to any protocol or specification, for example the USB power delivery protocol. In step 510, the encoded message can be decoded or deconstructed according to the specification. The data from the decoded message can be stored in temporary variables in a memory of the filter. In step 520 the data from the decoded message can be compared to the messaging specification. For example, if the messaging specification provides a range of valid values the decoded data can be compared to the range of valid values. For example, if the message formed according to the USB power delivery protocol and the message is, for example, a message from the computer specifying a voltage to the power supply, the compare step 520 can compare the voltage identified in the message (e.g. 20 v) to the range of acceptable values in the specification. If the data is out of bounds or out of range, this could indicate that the message was intentionally malformed and potentially includes unauthorized data transmissions.

It is contemplated by the inventors that a malware application on a computer could communicate using the USB power delivery messaging protocol with a nefarious power supply provided by a third party. Unauthorized data would likely be out of bounds or outside of specified ranges according to the messaging protocol. The process described in conjunction with FIG. 3 can verify that messages sent between the power supply and the computer comply with the protocol and thus are unlikely to include unauthorized data. Similarly, the filter can include preprogrammed "reasonable" values that specify ranges for data exchanged pursuant to the messaging protocol. The compare step 520 can further include comparing the received data to the "reasonable" values. Reasonable values can be set according to the intended use of the security device.

In step 530 the process can determine whether the decoded data is valid or invalid. Data that complies with the messaging specification or is within reasonable limits can be determined to valid messages. Data that does not comply with the messaging specification or is not within reasonable limits can be determined to be invalid messages.

In step 540, invalid messages can be discarded thus protecting the computer from receiving malformed messages or transmitting potentially sensitive information to the power supply. In step 550, valid messages can be reencoded according to the messaging specification. If the decoded data was stored in temporary memory, the data store in temporary memory can be used to reencode the messages. By reencoding the messages, the process can ensure that messages are formatted according to the messaging specification or protocol.

The main difference between the process described in conjunction with FIG. 3 and the process described in conjunction with FIG. 2 is that, in FIG. 3 the received message is decoded and the underlying data is compared to the specification. Valid messages are then reencoded according to the specification and passed through the filter. The additional steps of decoding and reencoding further enforce adherence to the messaging protocol and, if malformed malicious messages are not identified and discarded in step 540, the messages would be reencoded according to the specification in step 550 thus converting a malformed message into a valid formed message.

Figure 4:
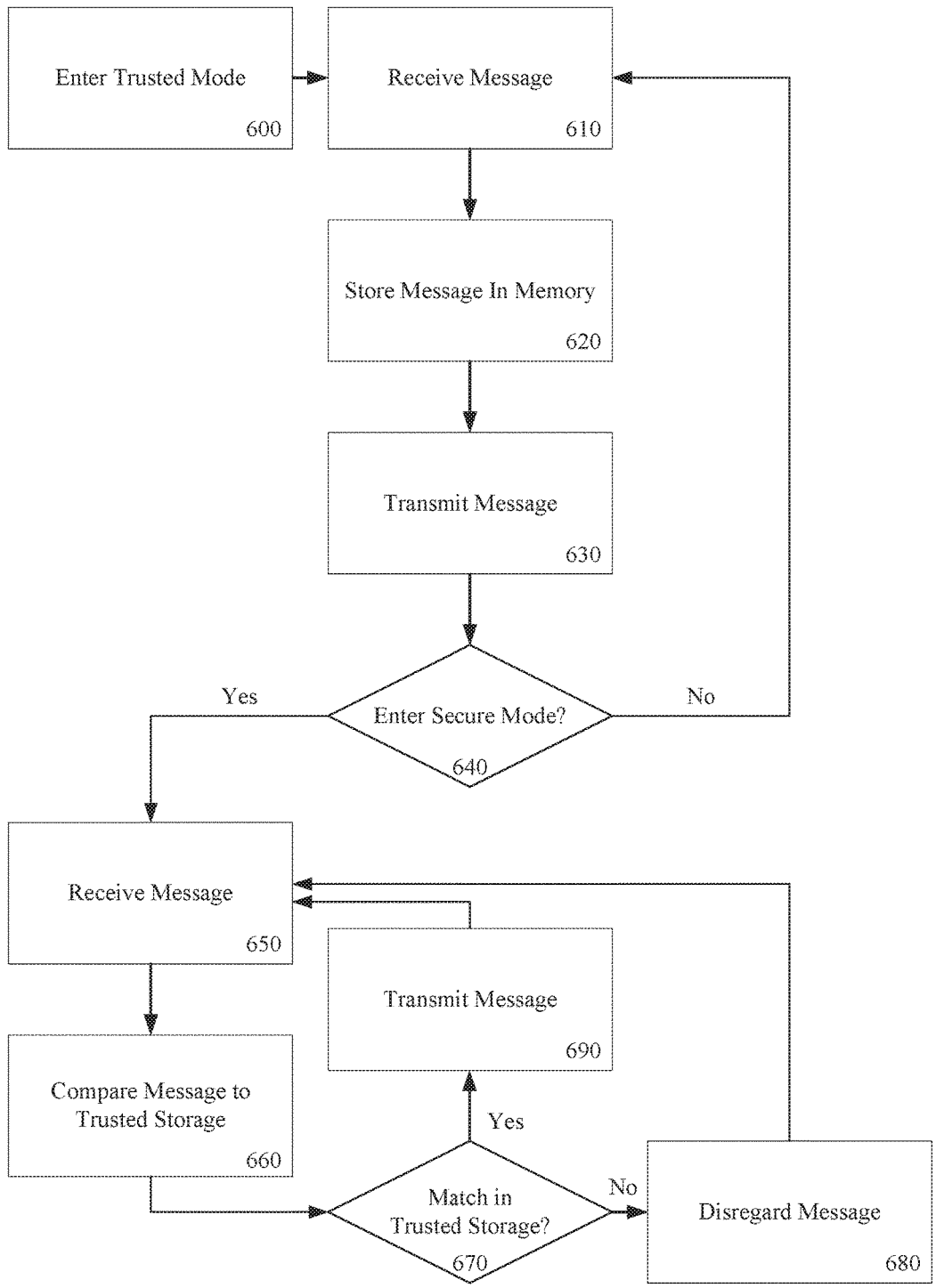
FIG. 4 is a process flow chart for a filter according to an embodiment of the invention.

FIG. 4 is a process flow chart for a filter according to an embodiment of the invention. As shown in FIG. 4, a filter can enter a trusted mode at 600, receive a message at 610, store a message in memory at 620, and transmit the message at 630. The filter can subsequently transition to a secure mode at 640, receive a second message at 650, compare the second message to a stored message at 660, determine if the second message matches the saved message at 670, and selectively discard 680 or transmit the message at 690.

In general, the concept of operation of the filter of FIG. 4 is that the filter has both a "trusted mode" and a "secure mode." Trusted mode can be used with a known secure power supply such as the power supply provided by the original equipment manufacturer. In trusted mode, messages sent between the device and the power supply can be logged in memory and passed-through without restriction. Only unique messages need to be logged. The logged messages in memory can represent known non-nefarious messages associated with normal operation because they were generated with a trusted power supply. The filter can alternatively be set to a secure mode. Secure mode can be used in connection with an untrusted power supply, such as a power supply provided by a third party at a hotel or café. In secure mode, messages sent between the power supply and the electronic device can be compared against the known trusted messages stored in the memory. Messages that match messages in the memory can be allowed to pass through the filter while messages that don't match messages in the memory can be discarded by the filter.

In step 600 the filter can be set to trusted mode. In trusted mode, messages can be logged and passed through the filter. The filter can be set to trusted mode by a user, for example, by flipping or setting a switch. In step 610, a message can be received in the filter while in trusted mode. The message can be received from one of the power supply or the electronic device. The message can be a message sent pursuant to a messaging protocol or specification such as the USB power delivery messaging protocol. In step 620 the received message can be stored in memory. In an embodiment of the invention, only unique messages are stored in step 620. In step 630, the received message is transmitted on to the electronic device or the power supply as appropriate. At step 640, the filter can determine whether it has been set to secure mode. If the filter has not been set to secure mode, the process can transition back to step 610 where the filter waits to receive, store, and transmit another message.

If the filter was set to secure mode in step 640, the process can transition to receive a message in step 650. After the message is received in step 650, the message is compared in step 660 to the messages stored in the memory of the filter. In practice, the number of unique messages sent between the electronic device and the power supply will be very small and the memory in the filter can also be very small. The comparison of step 660 can include comparing, on a binary basis, a received message to each message stored in the memory. In decision step 670 the filter determines if the message received in step 650 matches a message in the memory. If no match is found, the process transitions to discard step 680. If a match is found, the process transitions to transmit step 690.

In discard step 680 the message received in step 650 is discarded by the filter and is not transmitted. This could indicate that a message received in secure mode was not found in the filter's memory possibly indicating a nefarious or unauthorized message. In transmit step 690, the received message is transmitted by the filter. After either the discard step 680 or the transmit step 690, the process transitions back to the receive message step 650 where the process waits to receive a message while in secure mode.

It will be apparent to those skilled in the art that various modifications and variations can be made in the method and apparatus for isolating an electronic device from external data signals without departing from the spirit or scope of the invention. Thus, it is intended that embodiments of the invention cover the modifications and variations of this invention provided they come within the scope of the appended claims and their equivalents.

What is claimed is:

1. A security device for selectively isolating an electronic device from external data signals, the security device comprising:
   an input for receiving an external cable;
   an output for connecting to the electronic device;
   a dedicated configuration line coupled from the input to the output;
   a power line coupled from the input to the output;
   a ground line coupled from the input to the output;
   a plurality of data lines;
   a message memory;
   a filter;
   a first switch selectively coupling the plurality of data lines from the input to the output;
   wherein the dedicated configuration line is separate and distinct from the plurality of data lines;
   wherein the dedicated configuration line is configured to carry messages relating to transmission of electrical power over the power line;
   wherein the security device is configured to be set to one of a learning mode or a secure mode;
   wherein, in the learning mode, the security device is configured to store a first message received on the dedicated configuration line in the message memory and retransmit the first message; and
   wherein, in the secure mode, the security device is configured to compare a second message received on the dedicated configuration line to the first message, and in response to the second message matches the first message, the second message is retransmitted, and alternatively, in response to the second message does not match the first message, the second message is not retransmitted.

2. The security device of claim 1 wherein the message memory is prefilled with a plurality of trusted messages and the second message is compared against one of the plurality of trusted messages.

3. A method for operating security device to isolate an electronic device from potentially nefarious data signals emanating from an external device, the security device having at least a power line, a dedicated configuration line, and a plurality of data lines, the method comprising:
   installing the security device between the external device and the electronic device such that signals from the external device pass through the security device prior to entering to the electronic device;
   setting the security device to a learning mode and, while in the learning mode:
   receiving a trusted encoded message on the dedicated configuration line of the security device, the dedicated configuration line separate and distinct from the plurality of data lines and configured to carry messages relating to transmission of electrical power over the power line;
   storing the trusted encoded message in a message memory of the security device to create a stored trusted message;

retransmitting the trusted encoded message on the dedicated configuration line;

setting the security device to a secure mode and, while in the secure mode:

receiving a second encoded message on the dedicated configuration line;

comparing the second encoded message to the stored trusted encoded message; and retransmitting the second encoded message on the dedicated configuration line when the second encoded message matches the stored trusted encoded message.

4. A security device for selectively isolating an electronic device from external data signals, the security device comprising:

an input for receiving an external cable;

an output for connecting to the electronic device;

a dedicated configuration line coupled from the input to the output;

a power line coupled from the input to the output;

a ground line coupled from the input to the output;

a plurality of data lines;

a message memory;

a filter;

a first switch selectively coupling the plurality of data lines from the input to the output;

wherein the dedicated configuration line is separate and distinct from the plurality of data lines;

wherein the dedicated configuration line is configured to carry messages relating to transmission of electrical power over the power line;

wherein the security device is configured to be set to one of a learning mode or a secure mode;

wherein, in the learning mode, the security device is configured to store a second message received on the dedicated configuration line in the message memory and retransmit the second message; and wherein, in the secure mode, the security device is configured to compare a first message received on the dedicated configuration line to the second message stored in the message memory, and in response to the first message matches the second message, the first message is retransmitted, and alternatively, in response to the first message does not match the second message, the first message is not retransmitted.

5. The security device of claim 4 wherein, in the learning mode, the security device is configured to store a third message received on the dedicated configuration line in the message memory and retransmit the third message.

6. The security device of claim 4 wherein the message memory is prefilled with a plurality of trusted messages and the first message is compared against one of the plurality of trusted messages.

* * * * *